(12) United States Patent
Matsumoto et al.

(10) Patent No.: US 7,123,355 B2
(45) Date of Patent: Oct. 17, 2006

(54) METHOD FOR DETERMINING CORE POSITIONS OF OPTICAL ELEMENT ARRAY AND AN APPARATUS FOR DETERMINING CORE POSITIONS THEREOF

(75) Inventors: Akira Matsumoto, Nagoya (JP); Masashi Fukuyama, Inuyama (JP); Hironori Kurimoto, Kounan (JP)

(73) Assignee: NGK Insulators, Ltd., Nagoya (JP)

( * ) Notice: Subject to any disclaimer, the term of this patent is extended or adjusted under 35 U.S.C. 154(b) by 306 days.

(21) Appl. No.: 10/396,304

(22) Filed: Mar. 25, 2003

(65) Prior Publication Data

US 2003/0210389 A1   Nov. 13, 2003

Related U.S. Application Data

(60) Provisional application No. 60/371,096, filed on Apr. 9, 2002.

(51) Int. Cl.
  *G01B 11/26* (2006.01)
(52) U.S. Cl. .................. 356/153; 356/138; 356/73.1
(58) Field of Classification Search ............. 356/153, 356/138, 73.1; 382/141, 149, 151; 385/115, 385/116
See application file for complete search history.

(56) References Cited

U.S. PATENT DOCUMENTS 4,673,245 A * 6/1987 Kling et al. .................. 385/80
6,590,658 B1 * 7/2003 Case et al. .................. 356/401

* cited by examiner

*Primary Examiner*—Gregory J. Toatley, Jr.
*Assistant Examiner*—Roy M. Punnoose
(74) *Attorney, Agent, or Firm*—Burr & Brown

(57) ABSTRACT

A method for determining core positions of an optical element array is provided, including the steps of causing white light to be incident on a first end face of an optical element of an optical element array including at least one optical element that is aligned and secured on a substrate, imaging light passing through the at least one optical element which is emitted from an opposed second end face of the at least one optical element using imaging means, and determining a core position of the at least one optical element based on a resulting image. The emitted light is imaged by the imaging means at an imaging distance where a diameter of the emitted light in the resulting image is as small as possible.

14 Claims, 11 Drawing Sheets

METHOD FOR DETERMINING CORE POSITIONS OF OPTICAL ELEMENT ARRAY AND AN APPARATUS FOR DETERMINING CORE POSITIONS THEREOF

CROSS REFERENCE TO RELATED APPLICATION

This application claims the benefit of U.S. Provisional Application Ser. No. 60/371,096 filed Apr. 9, 2002, the entirety of which is incorporated herein by reference.

BACKGROUND OF THE INVENTION AND RELATED ART

The present invention relates to a method for determining core positions of an optical element array and an apparatus for determining core positions thereof. More particularly, the present invention relates to a method for determining core positions of an optical element array and an apparatus for determining core positions thereof capable of conveniently determining core positions of optical elements (optical fibers, lenses, and the like) on a substrate with high accuracy.

In recent years, accompanied by an increase in the capacity of data communications, there has been an increased demand for optical cross-connect switch technology excelling in processing capability for a large capacity of data communications. As one type of such technology, an optical switch manufactured using a MEMS (micro-electro-mechanical system), which is a technology used for micromachining in which fine processing is performed by a semiconductor process such as silicon etching, has been used. A surface-emitting laser, which enables high-definition and stable communications, has also been used, accompanied by an increased demand for securing reliability in addition to the demand for processing capability.

An optical element array, (examples of which include an optical fiber array, a lens array, a waveguide array (planar lightwave circuit: PLC), a semiconductor laser (LD) array, and a photodiode (PD) array) is used for the optical switch and the surface-emitting laser. It is necessary to determine the core positions of the optical fiber array with high accuracy from the viewpoint of decreasing light loss due to the connection and stability of the connection section. To deal with this demand, various methods for determining core positions of an optical element array, and apparatus for determining core positions thereof utilizing these methods have been used.

For example, in a method for determining core positions of an optical fiber array using a conventional apparatus for determining core positions of an optical fiber array, white light or the like applied from a light source installed on the back of a stage is caused to be incident on one end face of the optical fiber of the optical fiber array installed on the stage, and the light, which is allowed to pass through the core and is emitted from the other end face of the optical fiber, is imaged by using imaging means such as a CCD camera. The core position of the optical fiber array is determined by analyzing the resulting image using a specific analysist method.

However, in the conventional method for determining core positions, when the end face of the optical fiber array facing the imaging means is not horizontal to the imaging direction, the light emitted from the end face of the optical fiber array may be refracted due to the shape (angle-cut shape) of the end face, and the optical axis may deviate from the optical axis of the CCD camera, or the optical fiber array may be installed in the stage in a state in which the optical axis of the end face of the optical fiber array deviates from the optical axis of the CCD camera. This gives rise to problems in which the center position of the core displayed in the image varies depending on the imaging position (focus) of the imaging means such as the CCD camera from the end face of an optical fiber array 60, as shown in FIGS. 10(a) and (b).

If the imaging position (focus) of the imaging means such as the CCD camera varies between each determination of the core position, a determination error may occur when repeatedly determining the same core. Generally, the relative positional relation between each core is important for accuracy of the core positions of the optical fiber array. If the distance between the imaging position and the end face of the optical fiber array is equal, since each core to be imaged is merely shifted to either left or right at an equal distance, a change in the relative positional relation between the core positions does not occur, even if the optical axis of the light emitted from the end face of the optical fiber array deviates from the optical axis of the CCD camera. Therefore, the above problem occurs in the case where the imaging position (focus) of the imaging means varies between imaging of each core, and each core in the resulting image is shifted to the right or left, whereby the relative positional relation between each core differs each time the core position is determined. If the core position is determined under such conditions, the core position cannot be determined with high accuracy.

In the conventional method for determining core positions, when image processing the core of the optical fiber array by using the CCD camera or the like, the position of the core displayed on the display screen may vary during the determination of the core position of a multi-core array due to the pitch accuracy of the optical fiber array, the moving accuracy of the stage, and the like, even if imaging is started in a state in which the core is displayed at the center of the display screen which displays the image taken by the imaging means.

If the position of the core displayed on the display screen differs between each imaging, the core is imaged using different areas of the lens such as that of the CCD camera which images the core. This results in problems in which an image taken using the center of the lens may differ from an image taken using the edge of the lens due to aberration of the lens, or the shapes of the imaged cores may vary since the pixel distribution of the CCD camera or the like is changed each time the core is imaged, whereby the position of the core cannot be determined with accuracy.

In the conventional method for determining core positions, in the case where the optical fiber array is installed in a stage 64 in a tilted state as shown in FIG. 11, a distance A (hereinafter may be called "determination x") projected on a horizontal plane (xz plane) between two points of the adjacent optical fibers of the optical fiber array 60 which intersect a plane perpendicular to the imaging direction (z direction) is determined in the determination by image processing using the CCD camera or the like. However, the determination x differs from a distance B (hereinafter may be called "true value x") projected on the horizontal plane (xz plane) between two points of the optical fibers 62 which intersect a plane perpendicular to the central axes of the optical fibers in the horizontal plane (xz plane), which is originally required for the determination of the core positions of the optical fiber array 60. Therefore, the loss of light due to the connection may occur or the connection section may become unstable if the core positions are calculated using the determination x.

In particular, in the case where the optical fiber array 60 is manufactured by obliquely cuffing the end face in advance, if the optical fiber array 60 is installed on the stage 64 of the apparatus for determining core positions so that the axis of the light emitted from the end face is parallel to the imaging axis, an angle C (hereinafter may be called "array θx") formed by the plane perpendicular to the center axes of the optical fibers 62 and the side of the optical fiber array 60 from which the light is emitted is increased on the horizontal plane (xz plane). If the core position is imaged in this state, since the difference D (hereinafter may be called "determination z") in the distance between the imaging means 61 and the end faces of each optical fiber 62 from which the light is emitted is increased in the imaging direction (z direction), the distance at which the stage is driven in the z direction during imaging is inevitably increased. Since an error in the distance accompanied by driving the stage is increased as the drive distance is increased, a large error may occur when calculating the core position by correcting the array θx.

In the conventional method for determining core positions, a distance (hereinafter may be called "determination y") projected on a vertical plane (yz plane) between two points of the adjacent optical fibers of the optical fiber array which intersect a plane perpendicular to the imaging direction (z direction) differs from a distance (hereinafter may be called "true value y") projected on the vertical plane (yz plane) between two points of the adjacent optical fibers which intersect the plane perpendicular to the center axes of the optical fibers, which is originally required for the determination of the core positions of the optical fiber array. Therefore, the loss of light due to the connection may occur or the connection section may become unstable if the core positions are calculated by using the determination y. The core position is imaged by disposing an angle spacer having a specific correction tilt angle (hereinafter may be called "jig θy") on the stage depending on a tilt angle (hereinafter may be called "array θy") on the vertical plane (yz plane) formed by the plane perpendicular to the center axes of the optical fibers and the side of the optical fiber array from which the light is emitted. However, since the resulting determined value may differ from the true value y, this is insufficient for the determination of the core positions for which high accuracy is necessary.

SUMMARY OF THE INVENTION

The present invention has been achieved in view of the above problems. An object of the present invention is to provide a method for determining core positions of an optical element array and an apparatus for determining core positions thereof capable of conveniently determining core positions of optical elements (optical fibers, lenses, or the like) on a substrate with high accuracy.

In order to achieve the above object, the present invention provides the following method for determining core positions of an optical element array, and an apparatus for determining core positions thereof.

The present invention provides a method for determining core positions of an optical element array including the steps of causing white light to be incident on an end face of an optical element of an optical element array in which one or more optical elements are aligned and secured on a substrate, imaging the light which is allowed to pass through the optical element and is emitted from an opposed end face of the optical element by using imaging means, and determining a core position of the optical element from the resulting image, wherein the emitted light is imaged by the imaging means at a sufficient imaging distance such that a diameter of the emitted light displayed on the other end face of the optical element in the image is as small as possible (hereinafter referred to as the "first aspect").

In the method for determining core positions of an optical element array, the emitted light may be tentatively imaged while changing the distance between the imaging means and the other end face of the optical element, and the imaging distance may be calculated from the diameters of the emitted light at each distance in the resulting tentatively imaged images for each distance.

In the method for determining core positions of an optical element array, the imaging distances for at least two of the one or more optical elements of the optical element array may be calculated, and the emitted light may be imaged by calculating the imaging distances for the other optical elements from the at least two resulting imaging distances.

The present invention provides a method for determining core positions of an optical element array including the steps of causing white light to be incident on an end face of an optical element of an optical element array in which one or more optical elements are aligned and secured on a substrate, imaging the light which is allowed to pass through the optical element and is emitted an opposed other end face of the optical element using imaging means, and determining a core position of the optical element from the resulting image, wherein the emitted light is imaged by the imaging means while adjusting an imaging position of the image so that a center of the emitted light is displayed at a specific position of the image (hereinafter referred to as the "second aspect").

The present invention provides a method for determining core positions of an optical element array including the steps of causing white light to be incident on an end face of an optical element of an optical element array in which one or more optical elements are aligned and secured on a substrate, imaging the light which is allowed to pass through the optical element and is emitted from an opposed end face of the optical element using imaging means, and determining a core position of the optical element from the resulting image, by calculating a distance projected on a horizontal plane (xz plane) between two points of adjacent optical elements which intersect a plane perpendicular to an imaging direction (z direction) when the emitted light is imaged by the imaging means, calculating a difference in the distance between the imaging means and the opposed end faces of adjacent optical elements in the imaging direction (z direction), determining an angle formed by a plane perpendicular to the center axes of the optical elements and a side of the optical element array from which the light is emitted, and calculating a distance projected on the horizontal plane (xz plane) between two points of the adjacent optical elements which intersect the plane perpendicular to the center axes of the optical elements (hereinafter referred to as the "third aspect").

The present invention provides a method for determining core positions of an optical element array including the steps of causing white light applied from a light source to be incident on an end face of an optical element of an optical element array in which one or more optical elements are aligned and secured on a substrate, imaging the light which is allowed to pass through the optical element and which is emitted from an opposed end face of the optical element using imaging means, and determining a core position of the optical element from the resulting image, wherein the optical element is installed on a jig having a specific tilt angle, and wherein the core positions are determined by calculating a distance projected on a vertical plane (yz plane) between two points of adjacent optical elements which intersect a plane perpendicular to an imaging direction (z direction) from the resulting images, determining a tilt angle on a vertical plane (yz plane) formed by a plane perpendicular to center axes of the optical elements and the side of the optical element array from which the light is emitted, and calculating the distance projected on the vertical plane (yz plane) between two points of the adjacent optical elements which intersect the plane perpendicular to the center axes of the optical elements from the calculated distance, the determined tilt angle, and the tilt angle of the jig (hereinafter referred to as the "fourth aspect").

In the an apparatus for determining core positions of an optical element array of the first to fourth aspects, the optical element may be optical fiber or a lens.

The present invention provides an apparatus for determining core positions of an optical element array comprising a stage which moves an optical element array in which one or more optical elements are aligned and secured in specific directions, a light source which causes white light to be incident on an end face of the optical element, imaging means which images the light emitted from an opposed end face of the optical element, and a control section which controls the positions of the stage and the imaging means and determines a core position of each of the optical elements from an image imaged by the imaging means by calculating a sufficient imaging distance such that the diameter of the emitted light displayed on the opposed end face of the optical element in the image as small as possible (hereinafter referred to as the "fifth aspect").

According to the fifth aspect of the present invention, the emitted light may be tentatively imaged while changing the distance between the imaging means and the opposed end face of the optical element, and the imaging distance may be calculated from the diameters of the emitted light at each distance in the resulting tentatively imaged images and each distance.

The present invention provides the method for determining core positions of an optical fiber array of the fifth aspect, wherein the imaging distances for at least two of the one or more optical elements of the optical element array are calculated, and the emitted light is imaged by calculating the imaging distances for the other optical elements from the at least two resulting imaging distances.

The present invention provides an apparatus for determining core positions of an optical element array comprising a stage which moves an optical element array in which one or more optical elements are aligned and secured in specific directions, a light source which causes white light to be incident on an end face of the optical element, imaging means which images the light emitted from an opposed end face of the optical element, and a control section which controls positions of the stage and the imaging means and determines a core position of each of the optical elements from an image imaged by the imaging means, wherein the control section is capable of adjusting an imaging position of the image by moving the position of the stage and/or the imaging means so that the white light from the light source is incident on an end face of the optical element installed on the stage, and a center of the emitted light is imaged at a specific position of the image imaged by the imaging means (hereinafter referred to as the "sixth aspect").

The present invention provides an apparatus for determining core positions of an optical element array comprising a stage which moves an optical element array in which one or more optical elements are aligned and secured in specific directions, a light source which causes white light to be incident on an end face of the optical element, imaging means which images the light emitted from an opposed end face of the optical element, and a control section which controls positions of the stage and the imaging means and determines a core position of each of the optical elements from an image imaged by the imaging means, wherein the control section calculates a distance projected on the horizontal plane (xz plane) between two points of the adjacent optical elements which intersect the plane perpendicular to the center axes of the optical elements, and the distance projected on a horizontal plane (xz plane) between two points of the adjacent optical elements which intersect a plane perpendicular to an imaging direction (z direction) is calculated when the white light from the light source is caused to be incident on an end face of the optical element installed on the stage and imaging the emitted light by the imaging means, a difference in distance between the imaging means and the other end faces of the adjacent optical elements in the imaging direction (z direction), and determining an angle formed by a plane perpendicular to center axes of the optical elements and a side of the optical element array from which the light is emitted (hereinafter referred to as the "seventh aspect").

The present invention provides an apparatus for determining core positions of an optical element array comprising a stage which moves an optical element array in which one or more optical elements are aligned and secured in specific directions, a light source which causes white light to be incident on one of end faces of the optical element, imaging means which images the light emitted from the other end face of the optical element, and a control section which controls positions of the stage and the imaging means and determines a core position of each of the optical elements from an image imaged by the imaging means, characterized in that said control section calculates a distance projected on the vertical plane (yz plane) between two points of the adjacent optical elements which intersect the plane perpendicular to the center axes of the optical elements based on tilt angle of the jig with a distance projected on a vertical plane (yz plane) between two points of the adjacent optical elements which intersect a plane perpendicular to an imaging direction (z direction) is calculated from the resulting images when the white light applied from the light source is caused to be incident on one of the end faces of the optical element installed on a jig which is disposed on the stage and has a specific tilt angle and the emitted light is imaged by the imaging means, and determining a tilt angle on the vertical plane (yz plane) formed by a plane perpendicular to center axes of the optical elements and a side of the optical element array from which the light is emitted (hereinafter may be called "eighth aspect").

In the apparatus for determining core positions of an optical element array of the fifth to eighth aspects of the present invention, the optical element may be optical fiber or a lens.

DETAILED DESCRIPTION OF THE INVENTION

Figure 1:
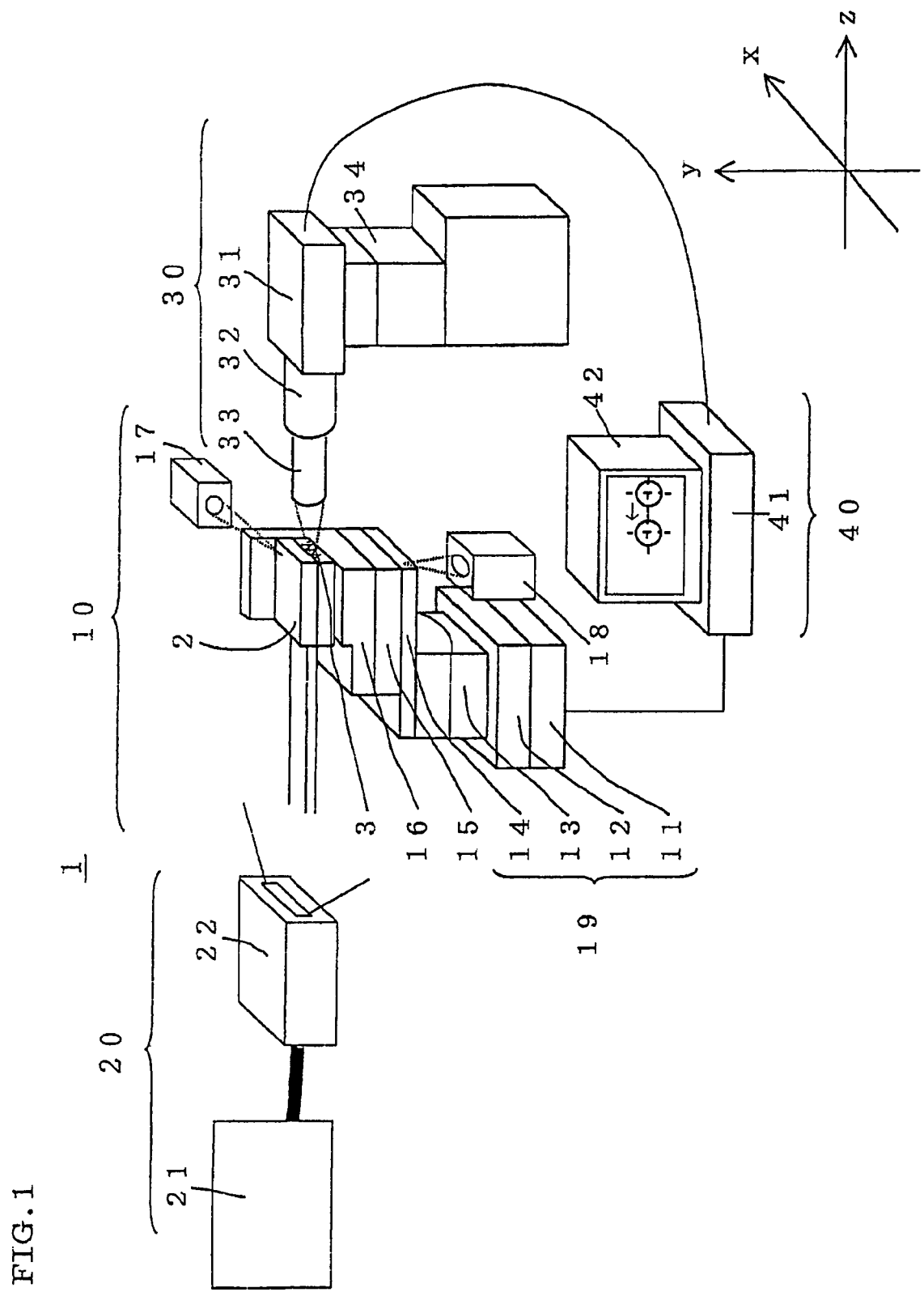
FIG. 1 is an oblique view showing an apparatus for determining core positions of an optical fiber array which is an embodiment of an apparatus for determining core positions of an optical element array according to a fifth aspect of the present invention.

Embodiments of apparatuses for determining core positions of an optical element array according to fifth to eighth aspects of the present invention are described below in detail with reference to the drawings taking an apparatus for determining core positions of an optical fiber array as an example, wherein the methods for determining core positions of an optical element array according to first to fourth aspects of the present invention are also described in detail. It should be understood that symbols in the drawings have the following meanings. Specifically, 1 indicates an apparatus for determining core positions of an optical fiber array, 2 indicates an optical fiber array, 3 indicates optical fiber, 10 indicates a stage, 11 indicates a z stage, 12 indicates an x stage, 13 indicates a θz stage, 14 indicates a base, 15 indicates an angle spacer, 16 indicates an optical fiber array setting jig, 17 and 18 indicate laser interferometers, 19 indicates a drive stage, 20 indicates a light source, 21 indicates a white light source, 22 indicates a nozzle, 30 indicates imaging means, 31 indicates a CCD camera, 32 indicates a microscope, 33 indicates a lens, 34 indicates a y stage, 40 indicates a control section, 41 indicates a computer, 42 indicates a display, 51 indicates an on-line setup jig, 52 indicates a positioning pin, 53 indicates an end face alignment plate, 54 indicates a reference position, 60 indicates an optical fiber array, 61 indicates imaging means, 62 indicates an optical fiber, and 64 indicates a stage.

(Fifth Aspect)

FIG. 1 is an oblique view showing an apparatus 1 for determining core positions of an optical fiber array according the fifth aspect of the present invention.

The apparatus 1 for determining core positions of an optical fiber array according to this aspect comprises a stage 10 which moves an optical fiber array 2 in which one or more optical fibers 3 are aligned and secured in specific directions, a light source 20 which causes white light to be incident on an end face of the optical fiber 3, imaging means 30 which images the light emitted from an opposed second end face of the optical fiber 3, and a control section 40 which controls positions of the stage 10 and the imaging means 30 and determines the core position of each of the optical fibers 3 from an image imaged by the imaging means 30. The control section 40 controls the positions of the stage 10 and the imaging means 30 by calculating an imaging distance (beam waist) to make the diameter of the emitted light displayed on the second end face of the optical fiber 3 in the image as small as possible.

The stage 10 is made up of a z stage 11, x stage 12, θz stage 13, base 14, angle spacer 15, optical fiber array setting jig 16, and the like, and is capable of setting the position of the end face of the optical fiber array 2 by driving a drive stage 19 including the z, x, and θz stages. The actual moving amount of the stage 10 and strain of the stage 10 can be correctly and accurately read by installing laser interferometers 17 and 18 in x and y axial directions of the stage 10.

The weight and height of the entire stage 10 are decreased by driving the stage 19 and replacing the angle spacer 15 with an angle spacer having a tilt angle corresponding to the angle of the end face of the optical fiber array 2, whereby an unstable state of the stage 10 can be prevented. The optical fiber array 2 can be positioned with high accuracy by positioning the angle spacer 15 based on three point pins provided on the base 14 and securing the angle spacer 15 using a screw or the like.

As the light source 20, a white light source 21 such as a halogen lamp may be used. Light is applied to an end face of the optical fiber array 2 from the white light source 21 through a nozzle 22.

The imaging means 30 is installed facing the opposed end face of the optical fiber array 2. The imaging means 30 is made up of a CCD camera 31, a microscope 32 which magnifies an image to be imaged, a lens 33, and a y stage 34 which drives the CCD camera 31, the microscope 32, and the lens 33 in the y axial direction. In this aspect, imaging is performed by using the CCD camera 31. However, imaging may be performed by using an infrared camera or the like.

The y stage 34 maybe included in the stage 10 instead of the imaging means 30. At least one component of the drive stage 19 of the stage 10 may be included in the imaging means 30.

The apparatus 1 for determining core positions of an optical fiber array according to this aspect also includes the control section 40 which is made up of a computer 41 which analyzes signals obtained from the laser interferometers 17 and 18, an image obtained from the CCD camera 31, and the like, and a display 42 which displays information to be obtained. The computer 41 is made up of a central processing unit (CPU) which calculates the core position determination and performs various types of analysis, a random access memory (RAM) which stores the information obtained from the laser interferometers 17 and 18 and the CCD camera 31, analytical results, and the like, a read only memory (ROM) in which an analytical program which calculates the core position determination and the like are stored, and a keyboard for inputting various types of data and the like.

Figure 2:
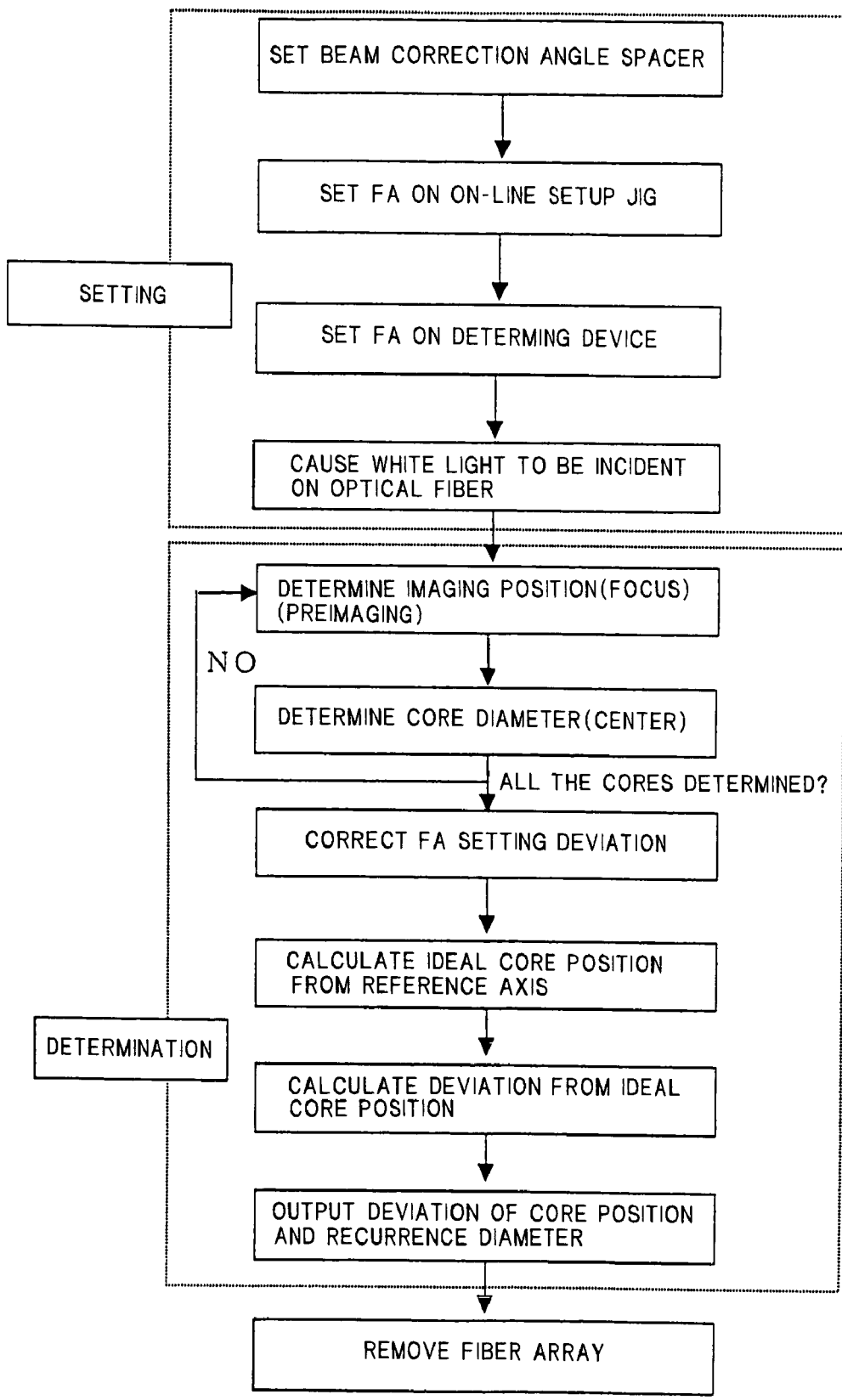
FIG. 2 is a flowchart showing a method for determining core positions of an optical fiber array using the apparatus for determining core positions thereof which is an embodiment of the apparatus for determining core positions of an optical element array according to the fifth aspect of the present invention.

A method for determining core positions of an optical fiber array using the apparatus for determining core positions thereof according the fifth aspect of the present invention is described below with reference to FIGS. 1 and 2. FIG. 2 is a flowchart showing the method for determining core positions of an optical fiber array using the apparatus for determining core positions thereof according the fifth aspect of the present invention.

As preparation before determination, the angle spacer 15, which is selected corresponding to the tilt angle of the end face of the optical fiber array 2, is installed in the stage 10. The optical fiber array 2 is installed in the optical fiber array setting jig 16, which is not installed on the stage 10. The optical fiber array setting jig 16 is installed on the angle spacer 15 together with the optical fiber array 2. White light is applied to an end face of the optical fiber array 2 using the light source 20.

After the preparation before determination, the imaging position (focus) of the imaging means 30 is determined. Specifically, an imaging distance (beam waist) sufficient to make the diameter of the emitted light displayed in a display 42 as small as possible is calculated by driving the optical fiber array 2 or the imaging position of the imaging means 30 using the stage 10 or the y stage 34, and the imaging position (focus) is determined using the calculated imaging distance. In this case, it is preferable to tentatively image the emitted light while changing the distance between the imaging means 30 and the end face of the optical fiber array 2, and to calculate the imaging distance based on the varying diameters of the emitted light at each distance in the resulting tentatively imaged images and each distance. The imaging distance may be calculated by drawing a quadric curve from the diameters of the emitted light in the resulting tentatively imaged images and each distance, and employing the minimum value of the quadric curve as the imaging distance, for example.

The light emitted from the end face of the optical fiber 3 is imaged from the imaging position (focus) at the imaging distance. The resulting data is stored in the control section 40. In the case where determination for all the optical fibers 3 which make up the optical fiber array 2 is not completed, determination for the remaining optical fibers 3 is sequentially performed by repeating the step of determining the imaging position (focus) and the step of imaging the emitted light in the flowchart to image all the optical fibers 3 which make up the optical fiber array 2.

In this case, it is preferable to calculate the imaging distances for at least two of the one or more optical fibers 3 aligned and secured in the optical fiber array 2, and to calculate the imaging distances for the other optical fibers 3 based on the at least two resulting imaging distances by the control section 40. According to this configuration, the determination time can be significantly decreased.

After imaging all the optical fibers 3, an ideal core position is calculated from a reference axis by the control section 40, a deviation from the ideal core position is calculated based on the resulting ideal core position and the determined core position, and the resulting deviation from the ideal core position and recurrence diameter are output to the display 42. In more detail, when processing the resulting image, the image is converted into two colors consisting of white (area in which light is strong) and black (area in which light is weak) by binarization. The brightness of the image at the boundary between white and black is set as a slice level. The slice level may be set to a design value (optional) or $1/e^2$. $1/e^2$ is a method in which the position of $1/e^2$ (boundary of mode field diameter) of the maximum image brightness is employed as the slice level.

When determining the core diameter which is binarized in this manner, the recurrence circle of the core is determined and the diameter of the recurrence circle is calculated. The recurrence circle is calculated by extracting 12 points of the binarized image edge points (boundary between white and black) of the core and operating the 12 points by the control section 40. The center of the core position is calculated by using a method of employing the center of the recurrence circle determined by the calculation of the core diameter as the center of the core position, or a method of employing the center of gravity of the white area of the binarized core image as the center of the core position.

As a method for calculating the core position, a both-end-based operation method or a recurrence-based operation method may be used. The both-end-based operation method is a method generally used for connection operations of the optical fiber array 2 and the like. The optical fiber array 2 is generally connected with waveguides or the like. Since it is very difficult to find a position at which the loss of light is minimum while causing light to be incident on all the ports, the optical fiber array 2 is aligned (adjusted to a position at which the quantity of light is maximum) while causing light to be incident on only the opposite ends of the optical fiber array 2 in the usual connection operations. Since the operations of the core positions are on the same basis as the alignment method with the waveguides, the core positions on the opposite ends of the optical fiber array 2 are determined in the both-end-based operation method.

In the case where the position of the core on one of the opposite ends of the optical fiber array 2 is shifted to a large extent, if the core positions are calculated by using the both-end-based operation method, there may be a case where calculation results in which all the core positions are shifted are obtained. The recurrence-based operation method is a method which prevents adverse effects caused by one core of which the position is shifted as much as possible by employing the recurrence line of all the cores as a reference.

The optical fiber array 2 is then removed from the stage 10. The apparatus for determining core positions of an optical fiber array according to this aspect determines the core positions in this manner.

The apparatus for determining core positions of an optical fiber array according to this aspect is particularly effectively used for the determination of the core position of an optical fiber array using a lensed fiber, in addition to the determination of the core-position of a conventional single mode (SM) fiber array. The lensed fiber may be used for coupling with a laser diode (LD) or coupling with a semiconductor optical amplifier (SOA) in order to increase coupling efficiency. The lensed fiber is an optical fiber having a tip provided with a lens effect by means of special processing.

The method for determining core positions of an optical fiber array using the apparatus according to this aspect determines the core position at a position of the beam waist. In a lensed fiber array (LFA), the lensed fibers are connected with laser diodes or the like at a position of the beam waist in order to increase coupling efficiency with the laser diodes or the like. Therefore, an important characteristic required for the lensed fiber array is the accuracy of the core position at a position of the beam waist in order to increase coupling efficiency with other functional parts. Therefore, this method for determining core positions of an optical fiber array is one of the ideal methods for determining core positions of an optical fiber array.

According to this configuration, the core position of each optical fiber on the substrate of the optical fiber array can be simply determined with high accuracy.

(First Aspect)

A method for determining core positions of an optical fiber array according the first aspect of the present invention is described below using the apparatus 1 for determining core positions of an optical fiber array shown in FIG. 1. The method for determining core positions of an optical fiber array according to this aspect includes causing white light applied from the light source 20 to be incident on one of the end faces of the optical fiber 3 of the optical fiber array 2 in which one or more optical fibers 3 are aligned and secured on the substrate, imaging the light which is allowed to pass through the optical fiber 3 and is emitted from the other end face of the optical fiber 3 by using the imaging means 30, and determining core positions of the core position of the optical fiber 3 from the resulting image, the method being characterized by comprising imaging the emitted light by the imaging means 30 at an imaging distance (beam waist) to make the diameter of the emitted light displayed on the other end face of the optical fiber 3 in the image minimum. In this case, it is preferable to image tentatively the emitted light while changing the distance between the imaging means 30 and the other end face of the optical fiber 3, and to calculate the imaging distance from the diameters of the emitted light at each distance in the resulting tentatively imaged images and each distance.

According to this configuration, the core position of each optical fiber on the substrate of the optical fiber array can be simply determined with high accuracy.

In this aspect, it is preferable to calculate the imaging distances for at least two of the one or more optical fibers 3 of the optical fiber array 2, and image the emitted light by calculating the imaging distances for the other optical fibers 3 from the at least two resulting imaging distances. According to this configuration, the determination time can be significantly decreased.

(Sixth Aspect)

An apparatus for determining core positions of an optical fiber array according to the sixth aspect of the present invention is described below.

The apparatus for determining core positions of an optical fiber array according to this aspect is configured in the same manner as the apparatus 1 for determining core positions of an optical fiber array shown in FIG. 1, and comprises the stage 10 which moves the optical fiber array 2 in which one or more optical fibers 3 are aligned and secured in specific directions, the light source 20 which causes white light to be incident on one of the end faces of the optical fiber 3, the imaging means 30 which images the light emitted from the other end face of the optical fiber 3, and the control section 40 which controls the positions of the stage 10 and the imaging means 30 and determines the core position of each of the optical fibers 3 from the image imaged by the imaging means 30, wherein the control section 40 adjusts the imaging position of the image by moving the position of the stage 10 and/or the imaging means 30 so that the white light applied from the light source 20 is incident on one of the end faces of the optical fiber 3 installed in the stage 10, and the center of the emitted light is imaged at a specific position of the image by the imaging means 30.

Figure 3:
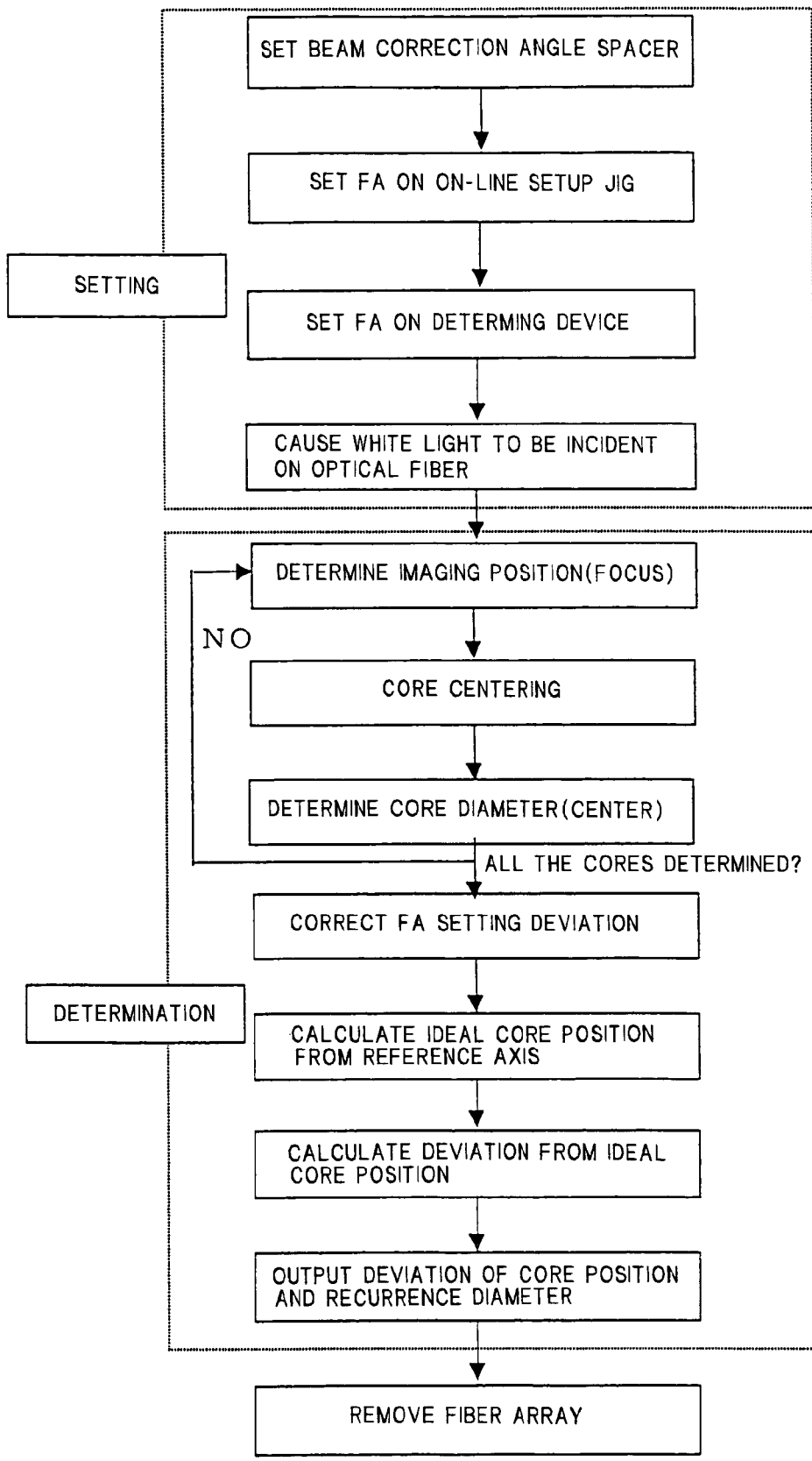
FIG. 3 is a flowchart showing a method for determining core positions of an optical fiber array using an apparatus for determining thereof which is an embodiment of an apparatus for determining core positions of an optical element array according to a sixth aspect of the present invention.

A method for determining core positions of an optical fiber array using the apparatus for determining core positions thereof according to this aspect is described below with reference to FIGS. 1 and 3. FIG. 3 is a flowchart showing the method for determining core positions of an optical fiber array using the apparatus for determining core positions thereof according to this aspect.

As preparation before determination, the angle spacer 15 selected corresponding to the tilt angle of the end face of the optical fiber array 2 to be determined is installed in the stage 10. The optical fiber array 2 is installed in the optical fiber array setting jig 16, which is not installed in the stage 10. The optical fiber array setting jig 16 is installed on the angle spacer 15 together with the optical fiber array 2. White light is applied to one of the end faces of the optical fiber array 2 using the light source 20.

After the preparation before determination, the imaging position (focus) of the imaging means 30 is determined. After determining the imaging position, the control section 40 adjusts the imaging position of the image by moving the position of the stage 10 and/or the imaging means 30 so that the center of the emitted light is imaged at a specific position of the image by the imaging means 30.

The core position can be determined with high accuracy by eliminating the difference in image caused by the aberration of the lens 33 by imaging the emitted light using only the specific region of the lens 33 of the imaging means 30, and reducing the change in pixel distribution of the CCD camera 31.

The light emitted from the end face of the optical fiber 3 is then imaged. The resulting data is stored in the control section 40. In the case where determination for all the optical fibers 3 which make up the optical fiber array 2 is not completed, determination for the remaining optical fibers 3 are sequentially performed by repeating the step of determining the imaging position (focus) and the step of imaging the emitted light in the flowchart to image the emitted light for all the optical fibers 3 which make up the optical fiber array 2. The subsequent method for determining core positions of an optical fiber array is the same as the method for determining core positions shown in FIG. 2. Specifically, the core positions of the optical fiber array 2 are determined by analyzing the resulting images by the control section 40.

According to this configuration, the difference caused by the aberration of the lens 33 and variation of the shape of the cores caused by the change in pixel distribution of the CCD camera 31 can be prevented, whereby the core positions of each optical fiber 3 on the substrate of the optical fiber array 2 can be conveniently determined with high accuracy.

(Second Aspect)

A method for determining core positions of an optical fiber array according to the second aspect of the present invention is described below using the apparatus 1 for determining core positions for an optical fiber array shown in FIG. 1. The method for determining core positions of an optical fiber array according to this aspect includes causing white light to be incident on one of the end faces of the optical fiber 3 of the optical fiber array 2 in which one or more optical fibers 3 are aligned and secured on the substrate, imaging the light which is allowed to pass through the optical fiber 3 and is emitted from the other end face of the optical fiber 3 by using the imaging means 30, and determining the core position of the optical fiber 3 from the resulting image, the method being characterized by comprising imaging the emitted light by the imaging means 30 while adjusting the imaging position of the image so that the center of the emitted light is displayed at a specific position of the image.

According to this configuration, the core positions of each optical fiber on the substrate of the optical fiber array can be conveniently determined with high accuracy.

(Seventh Aspect)

Figure 4:
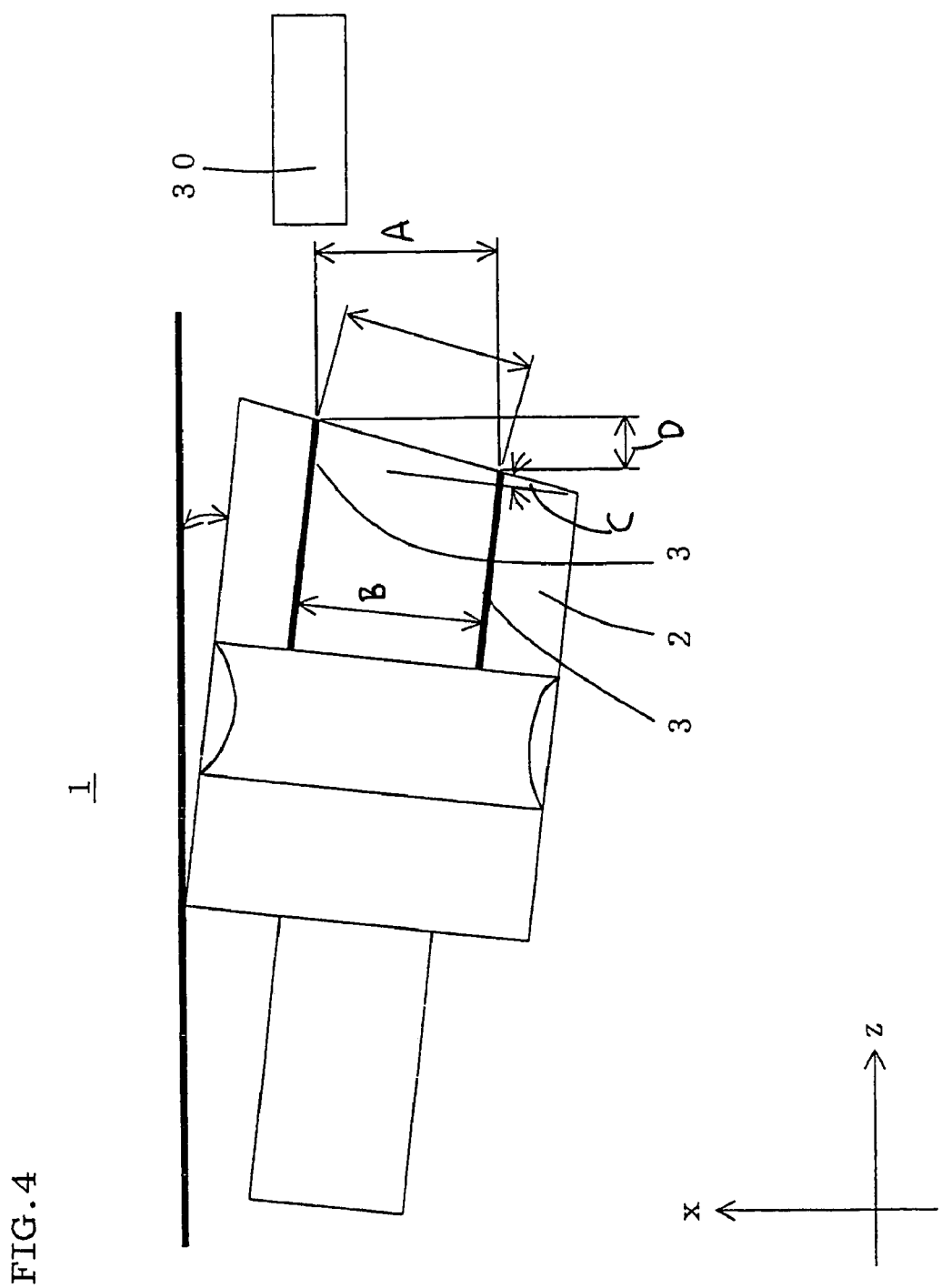
FIG. 4 is a horizontal projection drawing of an apparatus for determining core positions of an optical fiber array which is an embodiment of an apparatus for determining core positions of an optical element array according to a seventh aspect of the present invention.

An apparatus for determining core positions of an optical fiber array according to the seventh aspect of the present invention is described below with reference to FIGS. 1 and 4. FIG. 4 is a horizontal projection drawing of the apparatus for determining core positions of an optical fiber array according to this aspect.

The apparatus for determining core positions of an optical fiber array according to this aspect is configured in the same manner as the apparatus 1 for determining core positions of an optical fiber array shown in FIG. 1, and comprises the stage 10 which moves the optical fiber array 2 in which one or more optical fibers 3 are aligned and secured in specific directions, the light source 20 which causes white light to be incident on one of the end faces of the optical fiber 3, the imaging means 30 which images the light emitted from the other end face of the optical fiber 3, and the control section 40 which controls the positions of the stage 10 and the imaging means 30 and determines the core position of each of the optical fibers 3 from an image imaged by the imaging means 30, wherein when causing the white light applied from the light source 20 to be incident on one of the end faces of the optical fiber 3 installed in the stage 10 and imaging the emitted light by the imaging means 30, a distance A (determination x) projected on a horizontal plane (xz plane) between two points of the adjacent optical fibers 3 which intersect a plane perpendicular to an imaging direction (z direction) is calculated, a difference D (determination z) in distance between the imaging means 30 and the other end faces of the adjacent optical fibers 3 in the imaging direction (z direction) is calculated, an angle C (array θx) formed by a plane perpendicular to the center axes of the optical fibers 3 and a side of the optical fiber array 2 from which the light is emitted is determined, and a distance B (true value x) projected on the horizontal plane (xz plane) between two points of the adjacent optical fibers 3 which intersect the plane perpendicular to the center axes of the optical fibers 3 is calculated by the control section 40.

According to this configuration, the determination x, which is the determined value obtained by processing the images imaged by the CCD camera, is corrected by using the determination z and the array θx, and the true value x which is the original necessary value can be easily calculated, whereby the core positions of each optical fiber on the substrate of the optical fiber array can be conveniently determined with high accuracy. Moreover, even if the optical fiber array is installed to deviate from the imaging axis or the optical axis, the true value x, which is the calculation result, is not affected by calculating in this manner.

The array θx is calculated by using a tool maker's microscope or the like separately from the determination of the core position of the optical fiber array. In the case where the array θx is very small, since the value to be corrected and the corrected value are also very small, the design value of the end face of the optical fiber array may be input as the array θx.

Figure 5:
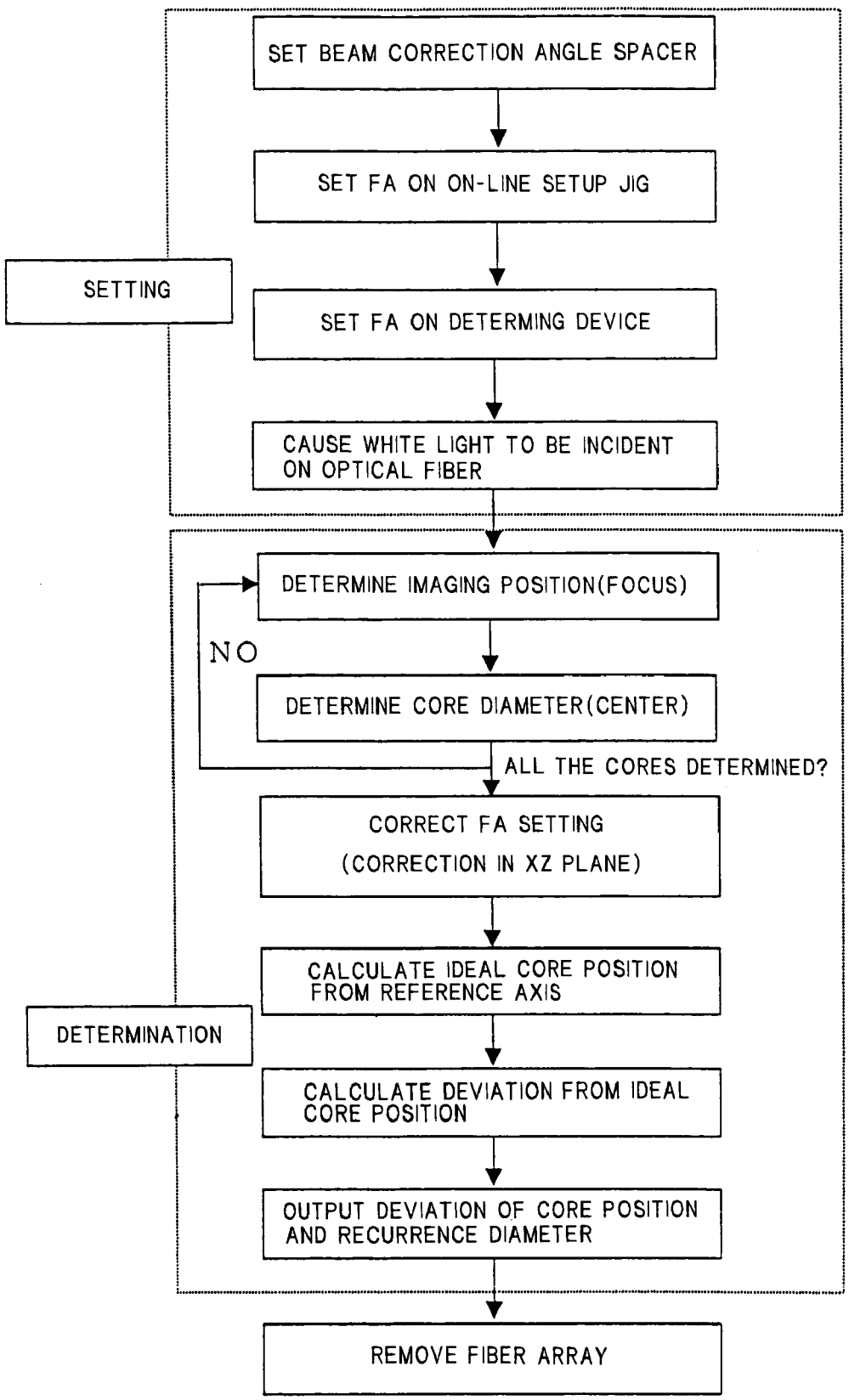
FIG. 5 is a flowchart showing a method for determining core positions of an optical fiber array using the apparatus for determining core positions thereof which is an embodiment of the apparatus for determining core positions of an optical element array according to the seventh aspect of the present invention.

A method for determining core positions using the apparatus for determining core positions of an optical fiber array according to this aspect is described below with reference to FIGS. 1 and 5. FIG. 5 is a flowchart showing the method for determining core position using the apparatus for determining core positions of an optical fiber array according to this aspect.

As preparation before determination, the angle spacer 15 selected corresponding to the tilt angle of the end face of the optical fiber array 2 to be determined is installed on the stage 10. The optical fiber array 2 is installed in the optical fiber array setting jig 16, which is not installed on the stage 10. The optical fiber array setting jig 16 is installed on the angle spacer 15 together with the optical fiber array 2. White light is applied to one of the end faces of the optical fiber array 2 using the light source 20.

After the preparation before determination, the imaging position (focus) of the imaging means 30 is determined. After determining the imaging position (focus), the light emitted from the end face of the optical fiber 3 is imaged. The resulting data is stored in the control section 40. In the case where determination for all the optical fibers 3 which make up the optical fiber array 2 is not completed, determination for the remaining optical fibers 3 is sequentially performed by repeating the step of determining the imaging position (focus) and the step of imaging the emitted light in the flowchart to image all the optical fibers 3 which make up the optical fiber array 2.

After imaging all the optical fibers 3, the distance B (true value x) projected on the horizontal plane (xz plane) between two points of the adjacent optical fibers 3 which intersect the plane perpendicular to the center axes of the optical fibers 3 is calculated from the distance A (determination x) projected on the horizontal plane (xz plane) between two points of the adjacent optical fibers 3 which intersect the plane perpendicular to the imaging direction (z direction), the difference D (determination z) in distance between the imaging means 30 and the other end faces of the adjacent optical fibers 3 in the imaging direction (z direction), and the angle C (array θx) formed by the plane perpendicular to the center axes of the optical fibers 3 and the side of the optical fiber array 2 from which the light is emitted.

According to this configuration, the determination x which is the determined value obtained by processing the images taken by the CCD camera is corrected by using the determination z and the array θx, and the true value x which is the original necessary value can be easily calculated, whereby the core position of each optical fiber on the substrate of the optical fiber array can be conveniently determined with high accuracy. Moreover, even if the optical fiber array is installed to deviate from the imaging axis, the true value x, which is the calculation result, is not affected by calculating in this manner.

(Third Aspect)

A method for determining core positions of an optical fiber array according to the third aspect of the present invention is described below using the apparatus 1 for determining core positions of an optical fiber array shown in FIG. 1. The method for determining core positions of an optical fiber array according to this aspect includes causing white light to be incident on one of the end faces of the optical fiber 3 of the optical fiber array 2 in which one or more optical fibers 3 are aligned and secured on the substrate, imaging the light which is allowed to pass through the optical fiber 3 and is emitted from the other end face by using the imaging means 30, and determining the core position of the optical fiber 3 from the resulting image, the method being characterized in that when imaging the emitted light is imaged by the imaging means 30, the distance A (determination x) projected on the horizontal plane (xz plane) between two points of the adjacent optical fibers 3 which intersect the plane perpendicular to the imaging direction (z direction) is calculated, the difference D (determination z) in distance between the imaging means 30 and the other end faces of the adjacent optical fibers 3 in the imaging direction (z direction) is calculated, the angle C (array θx) formed by the plane perpendicular to the center axes of the optical fibers 3 and the side of the optical fiber array 2 from which the light is emitted is determined, and the distance projected on the horizontal plane (xz plane) between two points of the adjacent optical fibers 3 which intersect the plane perpendicular to the center axes of the optical fibers 3 is calculated.

According to this configuration, the core position of each optical fiber on the substrate of the optical fiber array can be simply determined with high accuracy.

(Eighth Aspect)

Figure 6:
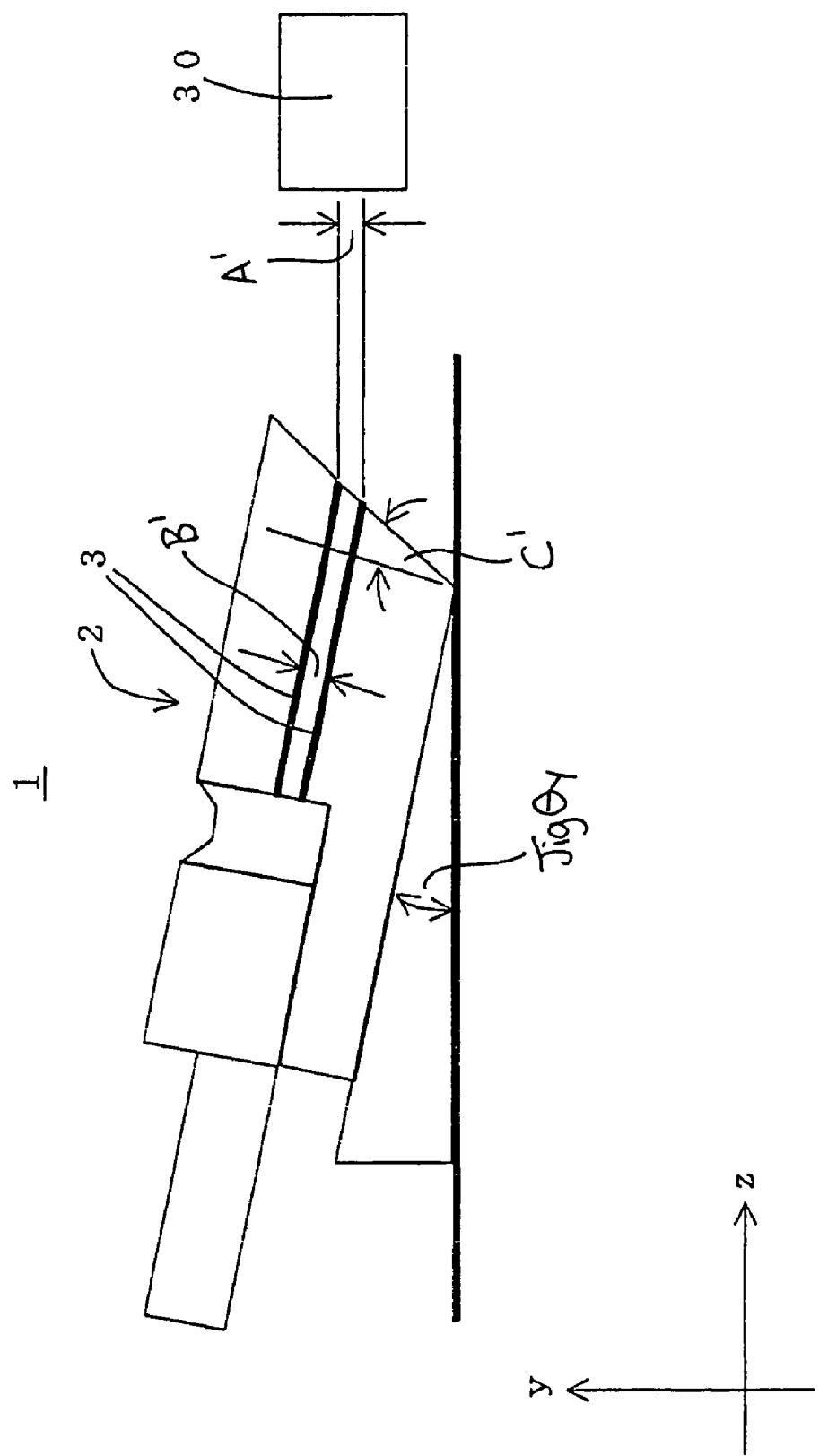
FIG. 6 is a vertical projection drawing of an apparatus for determining core positions of an optical fiber array which is an embodiment of an apparatus for determining core positions of an optical element array according to an eighth aspect of the present invention.

An apparatus for determining core positions of an optical fiber array according to the eighth aspect of the present invention is described below with reference to FIGS. 1 and 6. FIG. 6 is a vertical projection drawing of the apparatus for determining core positions of an optical fiber array according to this aspect.

The apparatus for determining core positions of an optical fiber array according to this aspect is configured in the same manner as the apparatus 1 for determining core positions of an optical fiber array shown in FIG. 1, and comprises the stage 10 which moves the optical fiber array 2 in which one or more optical fibers 3 are aligned and secured in specific directions, the light source 20 which causes white light to be incident on one of the end faces of the optical fiber 3, the imaging means 30 which images the light emitted from the other end face of the optical fiber 3, and the control section 40 which controls positions of the stage 10 and the imaging means 30 and determines a core position of each of the optical fibers 3 from an image taken by the imaging means 30, wherein the white light applied from the light source 20 is caused to be incident on one of the end faces of the optical fiber 3 installed on the angle spacer 15 which is disposed on the stage 10 and has a specific tilt angle, the emitted light is imaged by the imaging means 30, a distance A' (determination y) projected on a vertical plane (yz plane) between two points of the adjacent optical fibers 3 which intersect a plane perpendicular to the imaging direction (z direction) is calculated from the resulting images, a tilt angle C' (array θy) in the vertical plane (yz plane) formed by a plane perpendicular to the center axes of the optical fibers 3 and the side of the optical fiber array 2 from which the light is emitted is determined, and a distance B' (true value y) projected on the vertical plane (yz plane) between two points of the adjacent optical fibers 3 which intersect the plane perpendicular to the center axes of the optical fibers 3 is calculated by the control section 40 from the determination y, the array θy, and the tilt angle (jig θy) of the angle spacer 15.

According to this configuration, the determination y, which is the determined value obtained by processing the images imaged by the CCD camera, is corrected by using the array θy and the jig θy, and the true value y which is the original necessary value can be easily calculated, whereby the core position of each optical fiber on the substrate of the optical fiber array can be conveniently determined with high accuracy. Moreover, even if the optical fiber array is installed to deviate from the imaging axis, the true value y, which is the calculation result, is not affected by calculating in this manner.

The array θy is calculated by using a tool maker's microscope or the like separately from the determination of the core position of the optical fiber array. In the case where the array θy is very small, since the value to be corrected and the corrected value are also very small, the design value of the end face of the optical fiber array may be input as the array θy.

Figure 7:
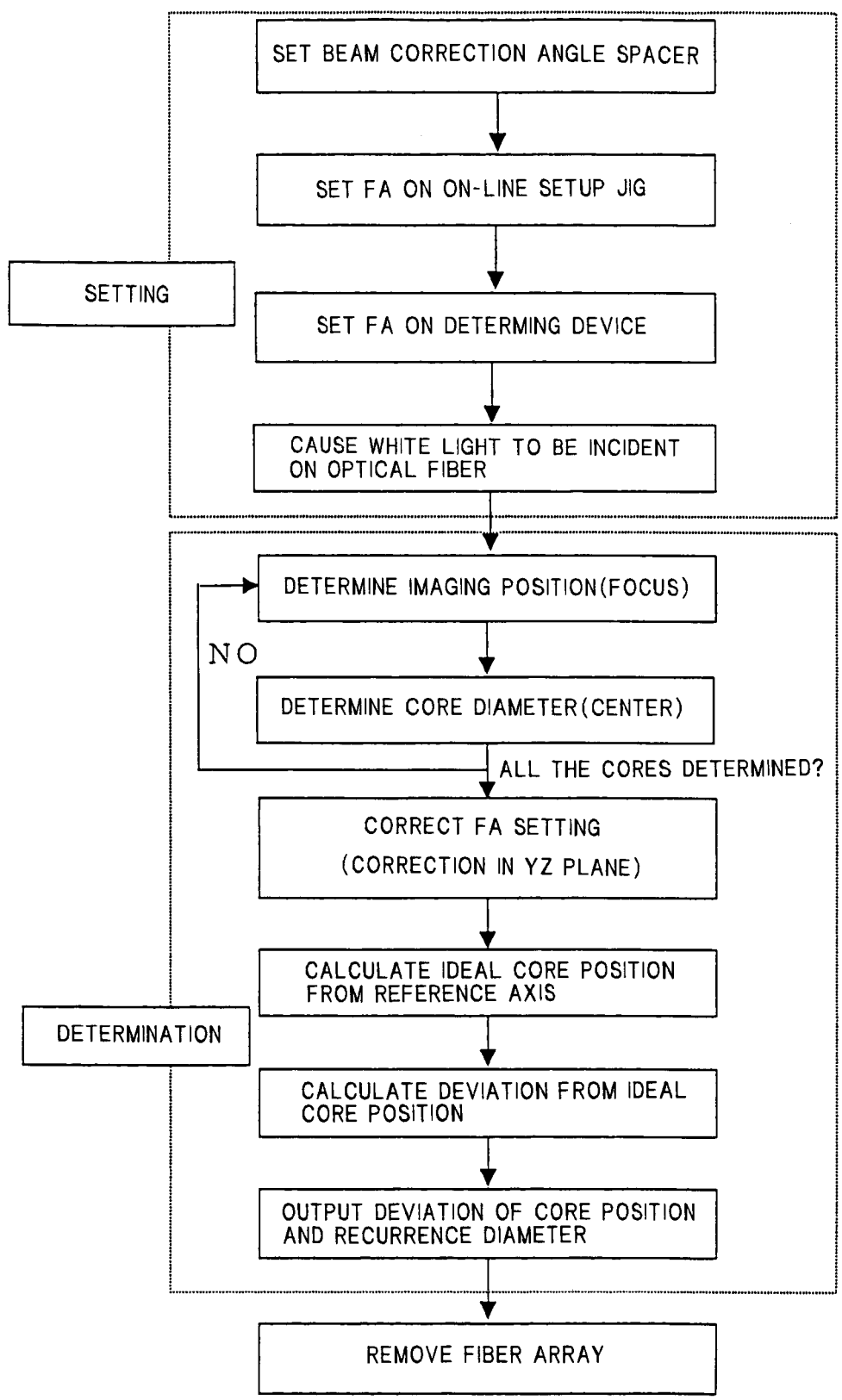
FIG. 7 is a flowchart showing a method for determining core positions of an optical fiber array using the apparatus for determining core positions thereof which is an embodiment of the apparatus for determining core positions of an optical element array according to the eighth aspect of the present invention.
Figures 8A, 8B, 8C, 8D:
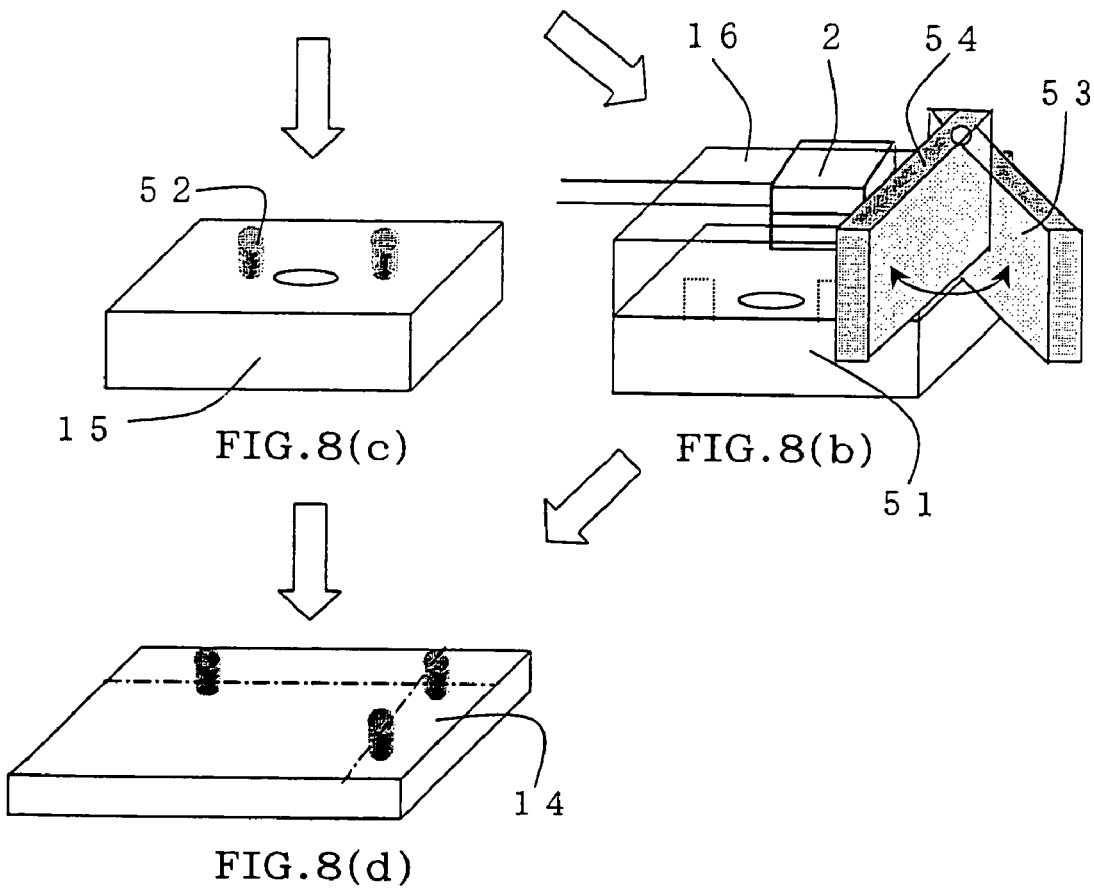
FIGS. 8(a), 8(b), 8(c), and 8(d) are oblique views showing steps of installing an optical fiber array in a method for determining core positions of an optical element array of the present invention.

A method for determining core positions of an optical fiber array using the apparatus for determining core positions thereof according to this aspect is described below with reference to FIGS. 1 and 7. FIG. 7 is a flowchart showing the apparatus for determining core positions-of an optical fiber array according to this aspect.

As preparation before determination, the angle spacer 15 selected corresponding to the tilt angle of the end face of the optical fiber array 2 to be determined is installed on the stage 10. The optical fiber array 2 is installed in the optical fiber array setting jig 16 which is not installed on the stage 10. The optical fiber array setting jig 16 is installed on the angle spacer 15 together with the optical fiber array 2. White light is applied to one of the end faces of the optical fiber array 2 using the light source 20.

After the preparation before determination, the imaging position (focus) of the imaging means 30 is determined. After determining the imaging position (focus), the light emitted from the end face of the optical fiber 3 is imaged. The resulting data is stored in the control section 40. In the case where determination for all the optical fibers 3 which make up the optical fiber array 2 is not completed, determination for the remaining optical fibers 3 is sequentially performed by repeating the step of determining the imaging position (focus) and the step of imaging the emitted light in the flowchart to image all the optical fibers 3 which make up the optical fiber array 2.

After imaging all the optical fibers 3, the distance (true value y) projected on the vertical plane (yz plane) between two points of the adjacent optical fibers 3 which intersect the plane perpendicular to the center axes of the optical fibers 3 is calculated from the distance (determination y) projected on the vertical plane (yz plane) between two points of the adjacent optical fibers 3 which intersect the plane perpendicular to the imaging direction (z direction), the tilt angle (array θy) in the vertical plane (yz plane) formed by the plane perpendicular to the center axes of the optical fibers 3 and the side of the optical fiber array 2 from which the light is emitted, and the tilt angle (jig θy) of the angle spacer 15, which are stored in the control section 40.

According to this configuration, the determination y, which is the determined value obtained by processing the images imaged by the CCD camera 31, is corrected by using the array θy and the jig θy, and the true value y which is the original necessary value can be easily calculated, whereby the core positions of each optical fiber 3 on the substrate of the optical fiber array 2 can be simply determined with high accuracy. Moreover, even if the optical fiber array 2 is installed to deviate from the imaging axis, the true value y, which is the calculation result, is not affected by calculating in this manner.

(Fourth Aspect)

A method for determining core positions of an optical fiber array according to the fourth aspect of the present invention is described below using the apparatus 1 for determining core positions of an optical fiber array shown in FIG. 1. The method for determining core positions of an optical fiber array according to this aspect includes causing white light applied from the light source 20 to be incident on one of the end faces of the optical fiber 3 of the optical fiber array 2 in which one or more optical fibers 3 are aligned and secured on the substrate, imaging the light which is allowed to pass through the optical fiber 3 and is emitted from the other end face of the optical fiber 3 by using the imaging means 30, and determining the core position of the optical fiber 3 from the resulting image, the method being characterized by comprising causing the white light applied from the light source 20 to be incident on one of the end faces of the optical fiber 3 installed on the angle spacer 15 having a specific tilt angle, imaging the emitted light by the imaging means 30, calculating the distance (determination y) projected on the vertical plane (yz plane) between two points of the adjacent optical fibers 3 which intersect the plane perpendicular to the imaging direction (z direction) from the resulting image, determining the tilt angle (array θy) in the vertical plane (yz plane) formed by the plane perpendicular to the center axes of the optical fibers 3 and the side of the optical fiber array 2 from which the light is emitted, and calculating the distance (true value y) projected on the vertical plane (yz plane) between two points of the adjacent optical fibers 3 which intersect the plane perpendicular to the center axes of the optical fibers 3 from the determination y, the array θy, and the tilt angle (jig θy) of the angle spacer 15.

According to this configuration, the core positions of each optical fiber on the substrate of the optical fiber array can be simply determined with high accuracy.

The present invention is described below in more detail by an example. However, the present invention is not limited by the following example.

The core positions of a 24-core optical fiber array made of low-expansion borosilicate glass (width: 9 mm, length: 12 mm, thickness: 3 mm, end face angle of optical fiber array: 8°, pitch: 250 μm) were determined. As a ribbon fiber of this optical fiber array, three 8-core ribbons were used.

In the determination of the core positions of the optical fiber array in this example, an apparatus for determining core positions of an optical fiber array having the same configuration as the apparatus 1 for determining core positions of an optical fiber array shown in FIG. 1 was used. The actual moving amount of the stage 10 and strain of the stage 10 were correctly and accurately read by installing the laser interferometers 17 and 18 in the x and y axes of the stage 10 of the apparatus 1 for determining core positions of an optical fiber array.

In this example, since the angle of the end face of the optical fiber array 2 was 8°, the angle spacer 15 having an angle of 3.7° was used so that light emitted from the end face of the optical fiber array 2 was parallel to the CCD camera 31. Effects of imaging position errors on the determined values were prevented as much as possible by making the light emitted from the end face of the optical fiber array 2 parallel to the CCD camera 31. The angle spacer 15 was positioned based on three point pins provided on the base and secured using a screw.

As shown in FIGS. 8(a) to (d), the optical fiber array setting jig 16 was placed on a jig which can be setup on-line (hereinafter called "on-line setup jig 51") based on positioning pins 52, and secured by the magnetic force of a built-in magnet. An end face alignment plate 53 is disposed on the on-line setup jig 51. The end face can be easily positioned by moving the end face alignment plate 53 to a reference position 54 and installing the optical fiber array 2 so that the end face of the optical fiber array 2 abuts on the end face alignment plate 53. Use of the on-line setup jig 51 enables the next optical fiber array 2 to be provided during the determination of the core position, whereby the number of determination steps can be decreased. Moreover, the imaging position of the emitted light with respect to the CCD camera 31 (see FIG. 1) is equalized by using the end face alignment plate 53 of the on-line setup jig 51, whereby the core can be easily found.

In this example, the optical fiber array 2 was secured by using a vacuum chuck method and a mechanical securing method. When the optical fiber array 2 was secured, the position of the end face alignment plate 53 was returned to the original position and the optical fiber array setting jig 16 was removed from the on-line setup jig 51. The optical fiber array setting jig 16 was inserted based on two positioning pins 52 on the angle spacer 15, and secured by magnetic force. The angle spacer 15 was secured on the base 14.

As shown in FIG. 1, a white light source was used to cause light to be incident on the optical fiber 3 of the optical fiber array 2. An emission port of the nozzle had a width of 50 mm and a height of 1 mm. Since the optical fiber array 2 in this example uses three 8-core ribbons, the three 8-core ribbons were installed side by side with respect to the emission port of the nozzle 22, and white light was caused to be incident on the core of the optical fiber 3.

The stage 10 was moved so that the light emitted from the optical fiber array 2 was displayed in the display 42, and the inclination of the core in the θz direction was adjusted by the θz stage 13 so as to be parallel to the CCD camera 31 while moving the x axis toward the ports on both ends so that the emitted light did not deviate from the screen during the determination.

Figure 9:
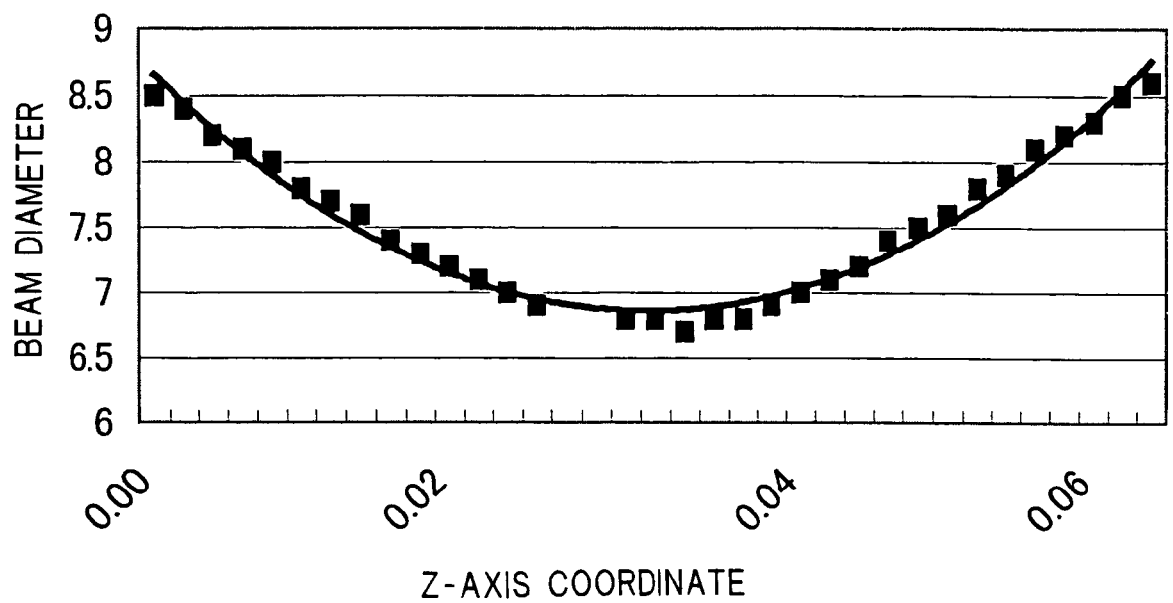
FIG. 9 is a graph showing detection results for a beam waist in a method for determining core positions of an optical element array of the present invention.
Figure 10A:
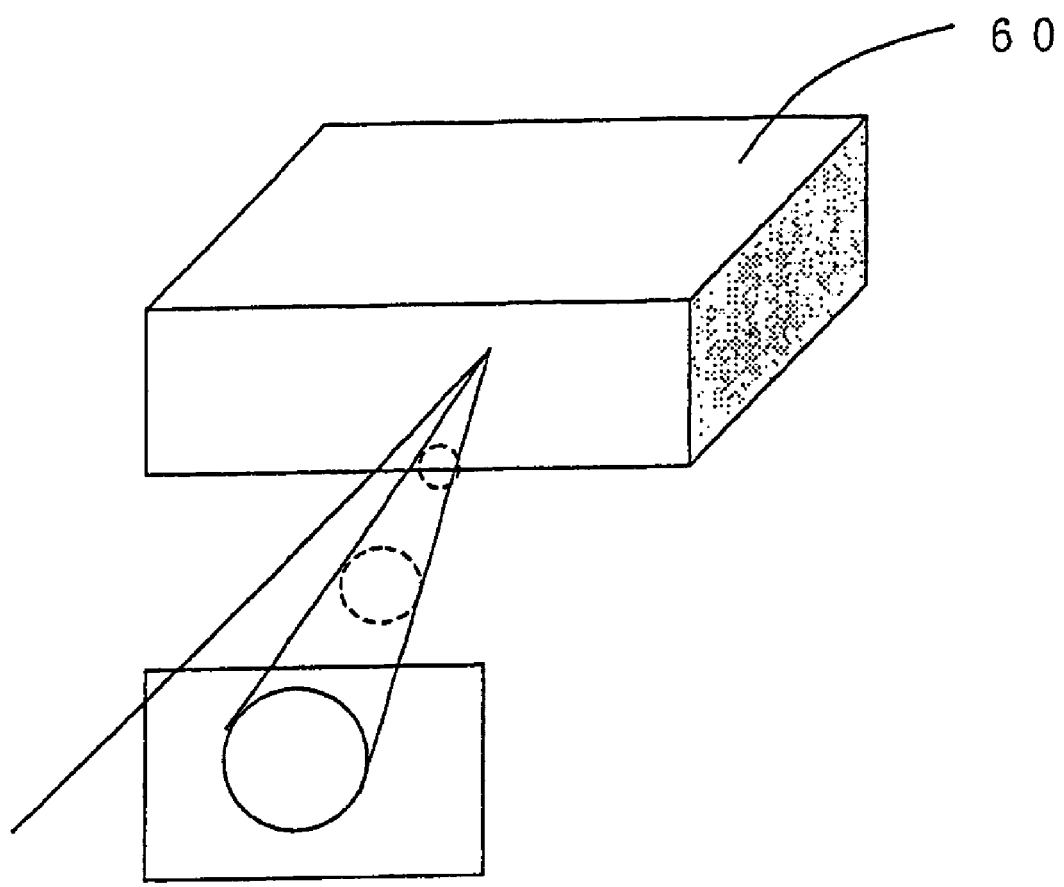
FIGS. 10(a) and (b) are views illustrating a conventional method for determining core positions of an optical element array, wherein (a) is an oblique view and (b) is a plan view showing an image.
Figure 10B:
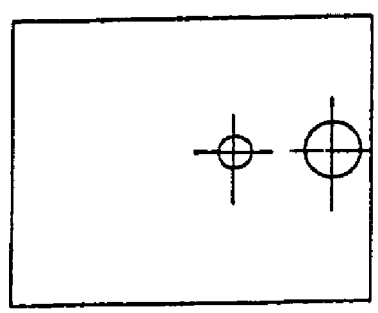
Figure 11:
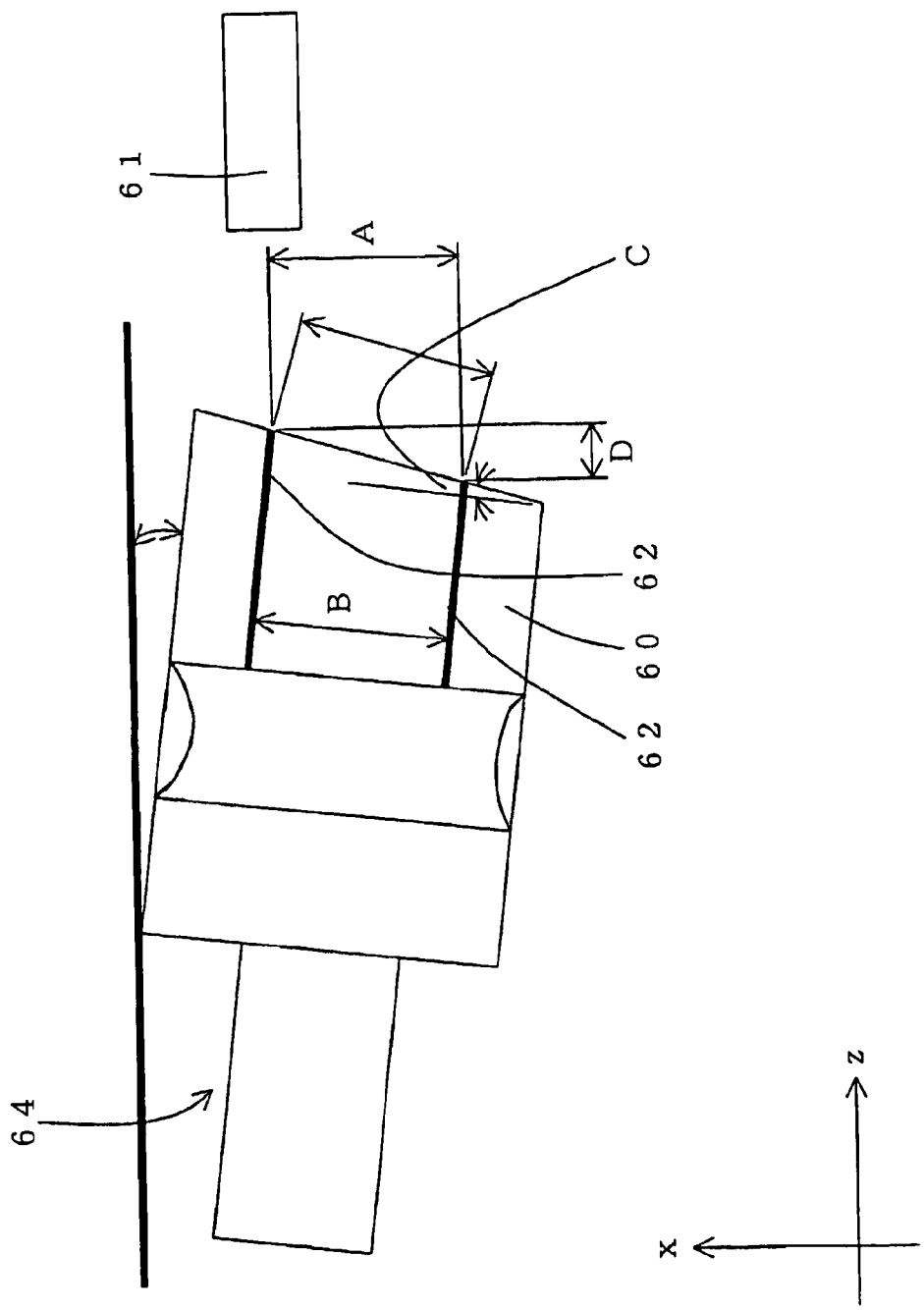
FIG. 11 is a plan view showing a conventional method for determining core positions of an optical element array.

The optical fiber array 2 was moved so that the core of the final port (24 port) was at the center of the display 42 and the imaging position was determined by detecting the beam waist. The imaging position (coordinates) of the final port (port 24) was stored in the computer 41. The optical fiber array 2 was moved so that the first port (port 1) was at the center of the display 42 and the imaging position was determined by detecting the beam waist. The imaging position (coordinates) of the first port (port 1) was stored in the computer 41. The imaging position of each port of the optical fiber array 2 was calculated from the two imaging positions (coordinates) of the two ports (1 and 24) by the computer 41. FIG. 9 shows detection results for the beam waist.

The optical fiber array 2 was moved so that the core of the first port (port 1) was at the center of the display 42, and the center of the emitted light was determined in order from the port 1. In this center determination, the center of the core was calculated by the computer 41 from the image processing coordinates and read laser determination coordinates. In this example, the center of the recurrence circle of the core beam was employed as the center of the core. However, the center of gravity can also be employed as the center of the core. After determining the centers of all the cores, an ideal position was calculated from the midpoint between the ports on both ends based on the line connecting the core centers of the ports on both ends, and the amount of deviation (distance) from the ideal position was calculated and output. Not only the amount of deviation from the ideal position, but also the recurrence circle of the core beam was output, and an error judgment function which judges whether or not abnormality of the recurrence diameter is present was provided.

The core position was repeatedly determined 10 times by using the above method while removing the optical fiber array for each determination. As a result, good results were obtained for variation of the core positions (average=0.06 µm, maximum=0.09 µm, and σ=0.02 µm).

As described above, according to the present invention, the core positions of the optical elements (optical fiber, lens, or the like) on the substrate can be simply determined with high accuracy.

What is claimed is:

1. A method for determining core positions of an optical element array, comprising the steps of:
   causing white light to be incident on a first end face of an optical element of an optical element array including at least one optical element that is aligned and secured on a substrate;
   imaging light that passes through the at least one optical element which is emitted from an opposed second end face of the at least one optical element using imaging means; and
   determining a core position of the at least one optical element based on a resulting image;
   wherein the emitted light is imaged by the imaging means at an imaging distance where a diameter of the emitted light in the resulting image is as small as possible.

2. The method for determining core positions of an optical element array according to claim 1, wherein the emitted light is tentatively imaged at varying distances between the imaging means and the second end face of the at least one optical element, wherein a diameter of the emitted light is determined for each distance, and wherein the imaging distance is calculated based on the diameters of the emitted light determined for each distance in the resulting tentatively imaged images.

3. The method for determining core positions of an optical element array according to claim 1, wherein imaging distances for at least two optical elements of the optical element array are calculated, and the emitted light is imaged by calculating the imaging distances for remaining optical elements of the optical element array based on the resulting imaging distances calculated for the at least two optical elements.

4. The method for determining core positions of an optical element array according to claim 1, wherein the optical element is one of an optical fiber and a lens.

5. A method for determining core positions of an optical element array comprising the steps of:
   causing white light to be incident on a first end face of an optical element of an optical element array including at least one optical element that is aligned and secured on a substrate;
   imaging light that passes through the at least one optical element which is emitted from an opposed second end face of the at least one optical element using imaging means; and
   determining a core position of the at least one optical element based on a resulting image, wherein said determining step comprises
   calculating a distance projected on a horizontal plane (xz plane) between two points of adjacent optical elements which intersect a plane perpendicular to an imaging direction (z direction) when the emitted light is imaged by the imaging means,
   calculating a difference in distances between the imaging means and the second end faces of the adjacent optical elements in the imaging direction (z direction), determining an angle formed between a plane perpendicular to central axes of the adjacent optical elements and a plane of a face of the optical element array from which the light is emitted, and
   calculating a distance projected on the horizontal plane (xz plane) between two points of the adjacent optical elements which intersect the plane perpendicular to the central axes of the adjacent optical elements.

6. A method for determining core positions of an optical element array comprising the steps of:
   causing white light to be incident on a first end face of an optical element of an optical element array including at least one optical element that is aligned and secured on a substrate which is installed on a jig having a specific tilt angle;
   imaging light that passes through the at least one optical element which is emitted from an opposed second end face of the at least one optical element using imaging means; and
   determining a core position of the at least one optical element based on a resulting image, wherein said determining step comprises
   calculating a first distance projected on a vertical plane (yz plane) between two points of adjacent optical elements which intersect a plane perpendicular to an imaging direction (z direction) based on the resulting images,
   determining a tilt angle on the vertical plane (yz plane) formed between a plane perpendicular to central axes of the adjacent optical elements and a plane of a face of the optical element array from which the light is emitted, and
   calculating a second distance projected on the vertical plane (yz plane) between two points of the adjacent optical elements which intersect the plane perpendicular to the central axes of the adjacent optical elements based on the first calculated distance, the determined tilt angle, and the tilt angle of the jig.

7. An apparatus for determining core positions of an optical element array comprising:
   an optical element array including at least one aligned and secured optical element;
   a stage for moving the optical element array in specific directions;
   a light source for causing white light to be incident on a first end face of the at least one optical element;
   imaging means for imaging light emitted from an opposed second end face of the at least one optical element; and
   a control section for controlling positions of the stage and the imaging means and for determining a core position of each optical element based on a resulting image from the imaging means, wherein the control section controls the positions of the stage and the imaging means by calculating an imaging distance where a diameter of the emitted light in the resulting image is as small as possible.

8. The apparatus for determining core positions of an optical element array according to claim 7, wherein the emitted light is tentatively imaged at varying distances between the imaging means and the second end face of the at least one optical element, wherein a diameter of the emitted light is determined for each distance, and wherein the imaging distance is calculated based on the diameters of the emitted light determined for each distance in the resulting tentatively imaged images.

9. The apparatus for determining core positions of an optical element array according to claim 7, wherein imaging distances for at least two optical elements of the optical element array are calculated, and the emitted light is imaged by calculating the imaging distances for remaining optical elements of the optical element array based on the resulting imaging distances calculated for the at least two optical elements.

10. The apparatus for determining core positions of an optical element array according to claim 7, wherein the optical element is one of an optical fiber and a lens.

11. An apparatus for determining core positions of an optical element array comprising:
   an optical element array including at least one aligned and secured optical element;
   a stage for moving the optical element array in specific directions;
   a light source for causing white light to be incident on a first end face of the at least one optical element;
   imaging means for imaging light emitted from an opposed second end face of the at least one optical element; and
   a control section for controlling positions of the stage and the imaging means and for determining a core position of each optical element based on a resulting image from the imaging means;
   wherein the control section calculates a first distance projected on horizontal plane (xz plane) between two points of adjacent optical elements which intersect a plane perpendicular to central axes of the adjacent optical elements, calculates a second distance projected on the horizontal plane (xz plane) between two points of the adjacent optical elements which intersect a plane perpendicular to an imaging direction (z direction) when white light is caused to be incident on of the first end face of the adjacent optical elements installed on the stage and the light emitted from the second end faces of the adjacent optical elements is imaged by the imaging means, calculates a difference in a distance between the imaging means and the second end faces of the adjacent optical elements in the imaging direction (z direction), and determines an angle formed between a plane perpendicular to the central axes of the adjacent optical elements and a plane of a surface of the optical element array from which the light is emitted.

12. The apparatus for determining core positions of an optical element array according to claim 11, wherein the optical element is one of an optical fiber and a lens.

13. An apparatus for determining core positions of an optical element array comprising:
   an optical element array including at least one aligned and secured optical element and which is disposed on a jig;
   a stage for moving the optical element array in specific directions on which the jig is installed;
   a light source for causing white light to be incident on a first end face of the at least one optical element;
   imaging means for imaging light emitted from an opposed second end face of the at least one optical element; and
   a control section for controlling positions of the stage and the imaging means and for determining a core position of each optical element based on a resulting image from the imaging means;
   wherein the control section calculates a first distance projected on a horizontal plane (xz plane) between two points of adjacent optical elements which intersect a plane perpendicular to the central axes of the adjacent optical elements based on a tilt angle of the jig, calculates a second distance projected on a vertical plane (yz plane) between two points of the adjacent optical elements which intersect a plane perpendicular to an imaging direction (z direction) based on the resulting images when the white light is caused to be incident on the first end faces of the adjacent optical elements and the light emitted from the second end faces of the optical elements is imaged by the imaging means, and wherein the control section determines a tilt angle on the vertical plane (yz plane) formed between a plane perpendicular to the central axes of the adjacent optical elements and a plane of a surface of the optical element array from which the light is emitted.

14. The apparatus for determining core positions of an optical element array according to claim 13, wherein the optical element is one of an optical fiber and a lens.

* * * * *